(12) United States Patent
Kapoor et al.

(10) Patent No.: US 9,268,659 B2
(45) Date of Patent: Feb. 23, 2016

(54) DETECTING FAILOVER IN A DATABASE MIRRORING ENVIRONMENT

(75) Inventors: Aditya Kapoor, Bellevue, WA (US); Wenlu Ma, Sammamish, WA (US); Craig G. Duncan, Issaquah, WA (US)

(73) Assignee: EMC CORPORATION, Hopkinton, MA (US)

( * ) Notice: Subject to any disclaimer, the term of this patent is extended or adjusted under 35 U.S.C. 154(b) by 368 days.

(21) Appl. No.: 11/326,035

(22) Filed: Jan. 5, 2006

(65) Prior Publication Data

US 2007/0156781 A1 Jul. 5, 2007

(51) Int. Cl.
| | | |
|---|---|---|
| G06F 17/00 | (2006.01) | |
| G06F 11/20 | (2006.01) | |
| G06F 11/14 | (2006.01) | |
| G06F 17/30 | (2006.01) | |

(52) U.S. Cl.
CPC ........ *G06F 11/2094* (2013.01); *G06F 11/1458* (2013.01); *G06F 17/30306* (2013.01)

(58) Field of Classification Search
None
See application file for complete search history.

(56) References Cited

U.S. PATENT DOCUMENTS

| | | | | |
|---|---|---|---|---|
| 6,460,144 B1* | 10/2002 | Ashcroft | ............. | G06F 11/1662 714/4.11 |
| 6,829,687 B2* | 12/2004 | Pai | ...................... | G06F 11/1453 709/200 |
| 6,868,067 B2* | 3/2005 | Rostron | .............. | G06F 11/1489 370/241 |
| 7,003,694 B1* | 2/2006 | Anderson et al. | ................ | 714/16 |
| 7,197,660 B1* | 3/2007 | Liu | ..................... | G06F 11/2035 714/4.12 |
| 7,631,020 B1* | 12/2009 | Wei et al. | ............... | 1/1 |
| 7,693,931 B2* | 4/2010 | Polan | ................... | G06F 11/1482 709/201 |
| 2002/0087687 A1* | 7/2002 | Zaifman | ............. | G06F 11/0793 709/225 |
| 2004/0054699 A1* | 3/2004 | Bear et al. | ..................... | 707/204 |
| 2004/0158588 A1* | 8/2004 | Pruet, III | ...................... | 707/204 |
| 2004/0260736 A1* | 12/2004 | Kern et al. | .................... | 707/204 |
| 2004/0267809 A1* | 12/2004 | East et al. | .................. | 707/104.1 |
| 2005/0071588 A1* | 3/2005 | Spear et al. | .................... | 711/162 |
| 2005/0149684 A1* | 7/2005 | Sankaran et al. | ............. | 711/162 |
| 2005/0160305 A1* | 7/2005 | Soejima | ............................ | 714/2 |
| 2005/0276215 A1* | 12/2005 | Kitani | ................. | H04L 49/1523 370/217 |
| 2006/0010174 A1* | 1/2006 | Nguyen et al. | ................ | 707/202 |
| 2006/0143497 A1* | 6/2006 | Zohar et al. | ....................... | 714/4 |
| 2006/0149797 A1* | 7/2006 | Chai et al. | ..................... | 707/204 |
| 2007/0038682 A1* | 2/2007 | Kulesza et al. | ............... | 707/202 |

FOREIGN PATENT DOCUMENTS

| | | | |
|---|---|---|---|
| JP | 2001-344125 | * | 12/2001 |
| JP | 2005-130049 | * | 5/2005 |

OTHER PUBLICATIONS

Rizzo, Thomas, Ch15, Database Mirroring, from Pro SQL Server 2005, Machanic, Adam et al., Sep. 2005. Apress Pub. (Online) Internet http://download.microsoft.com/download/f/8/5/f8520d64-f109-4111-b0b0-51f1f6d2d220/ProSQLServer2005_Ch15ForTechEd.pdf.

\* cited by examiner

*Primary Examiner* — Polina Peach
(74) *Attorney, Agent, or Firm* — Workman Nydegger (57) ABSTRACT

In one example, a method for detecting failover in a database mirroring system that begins when a determination is made as to the time of the most recent backup of the principal database. Next, the time of the most recent backup of the mirror database is determined. Then, the time of the most recent backup of the principal database is compared to the time of the most recent backup of the mirror database to determine if the principal database was backed up most recently. Finally, if the mirror database is the database that was backed up most recently, it is established that failover has occurred.

17 Claims, 6 Drawing Sheets

DETECTING FAILOVER IN A DATABASE MIRRORING ENVIRONMENT

BACKGROUND OF THE INVENTION

1. The Field of the Invention

The present invention relates to systems and methods for backing up data. More particularly, embodiments of the invention relate to systems and methods for backing up data based on the detection of failover events in a database mirroring environment.

2. Related Technology

Database mirroring is a process of synchronizing data between two databases, each of which resides on a respective database server. At any given time in the database mirroring process, one database performs the role of principal database, and the other database performs the role of mirror database. Initially, the data on the mirror database is an exact duplicate of the data on the principal database. As users interact with the database mirroring system, all requests for updates to the data are directed toward the principal database. Each time an update request is performed on the principal database, the same update is automatically performed on the mirror database. Thus, as long as the database mirroring process is functioning properly, the data on the mirror database will continue to be an exact duplicate of the data on the principal database.

Maintaining synchronized copies of a database on two separate servers allows for failover. Failover is a process that automatically switches the "principal" and "mirror" roles of the two databases in a database mirroring environment. After failover, the pre-failover mirror database takes on the role of principal database, and the pre-failover principal database might take on the role of mirror database, if the pre-failover principal database is still available. Thereafter, the mirror database will be continually updated with each update made to the principal database.

Failover is an important fault tolerance function of mission-critical systems that rely on uninterrupted accessibility. Failover is desirable, for example, in the situation where the database server on which the principal database resides becomes unavailable. A database server may become unavailable because of, for example, a hardware or software or network failure. Where failover has occurred because the pre-failover principal database has become unavailable, and due to failover the pre-failover mirror database has been redesignated as the principal database, the data on the mirror database will not be updated with the updates made to the data on the principal database during the time that the mirror database is unavailable. However, once the mirror database becomes available and the mirror relationship is re-established, all updates made to the principal database since failover will automatically be made to the mirror database.

One goal of many failover processes is to make the failover occur as seamlessly as possible from the perspective of the end user, so that the user is not made aware that the pre-failover principal database has become unavailable or that the failover has even occurred. The capacity for automatic failover allows for normal database function despite interruptions caused by problems with the database server where the pre-failover principal database resides. However, failover processes can sometimes present challenges to the implementation of database backup processes that are performed on the principal database.

Data backup in a database mirroring environment is a process that typically involves making a copy of the data stored in the principal database. Data backup makes possible the restoration of the principal and/or mirror databases. For example, in the event that the principal database and mirror database become temporarily or permanently unavailable, the principal and mirror databases can be restored using the copy of the data created during data backup. Systems and methods for performing database backup are typically configured to perform a variety of types of backup to prevent data loss, depending on the state of the database at the time of backup. For example, a failover event can affect the state of the database, which can in turn affect the type of backup which should be performed.

Current database mirroring technology that implements failover does not notify a software application that is run intermittently or on an ad hoc basis that failover has occurred. Since data backup software applications are typically run intermittently instead of continuously, detecting failover is a challenge for intermittently-run data backup software applications.

BRIEF DESCRIPTION OF THE DRAWINGS

To further clarify various aspects of exemplary embodiments of the present invention, a more particular description of the invention will be rendered by reference to specific exemplary embodiments thereof which are illustrated in the appended drawings. It is appreciated that these drawings depict only exemplary embodiments of the invention and are therefore not to be considered limiting of its scope. The drawings are not drawn to scale. The invention will be described and explained with additional specificity and detail through the use of the accompanying drawings in which.

DETAILED DESCRIPTION OF EXEMPLARY EMBODIMENTS OF THE INVENTION

I. An Exemplary Database Operations System

Figure 1:
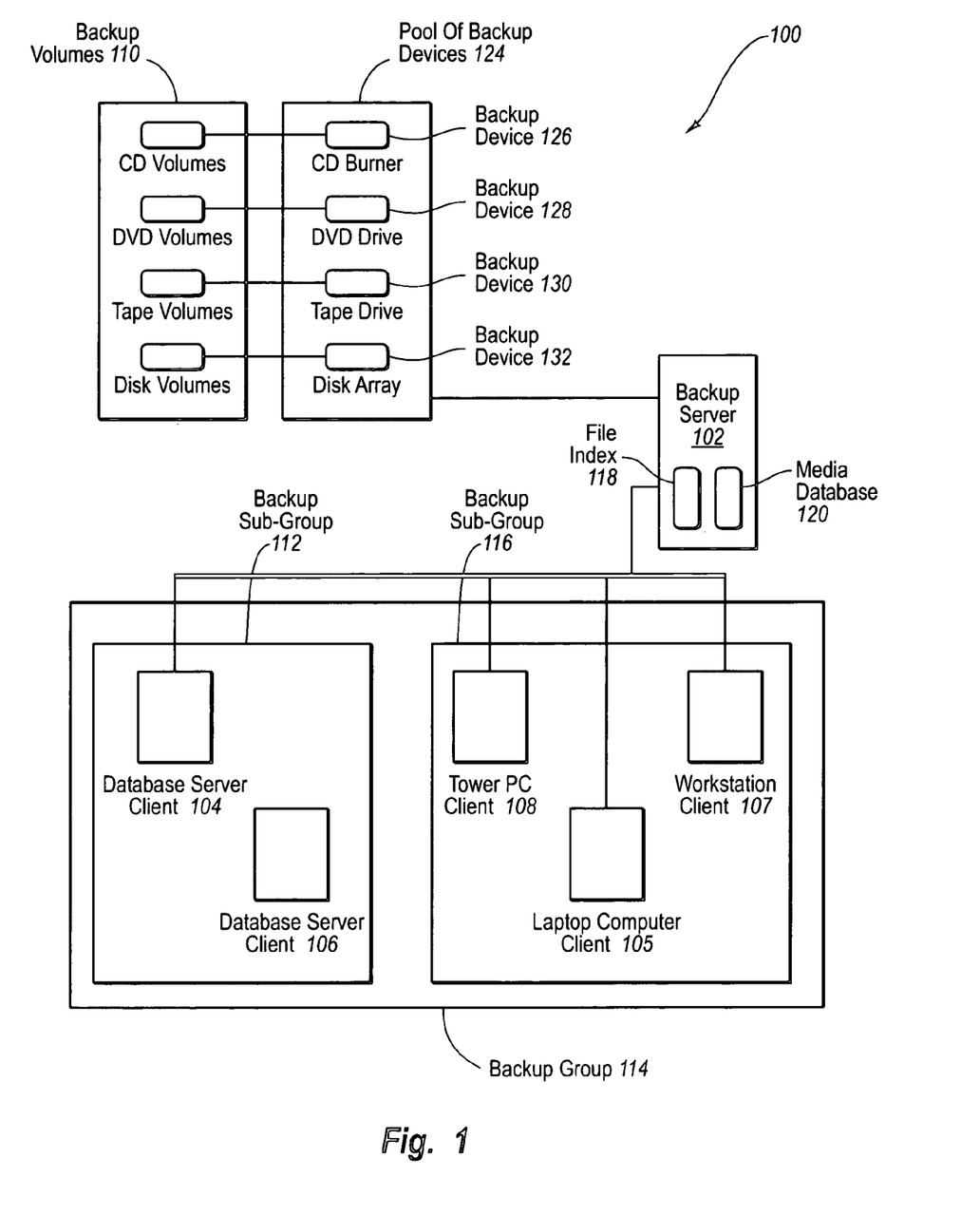
FIG. 1 illustrates an exemplary system for backing up file system data within a network.

One operational environment suitable for embodiments of the present invention is shown in FIG. 1. FIG. 1 illustrates an exemplary file system data backup and recovery system ("DBRS") 100 which generally functions to reproduce online file system data at a storage location and maintains location and obsolescence tracking information about the data. If the online version of the data is lost or corrupted, DBRS 100 can restore the data. In the event that the network in which DBRS 100 operates experiences a disaster, DBRS 100 can restore all DBRS 100 file systems to their original respective structures, as the file systems existed when written to storage.

An exemplary embodiment of DBRS 100 includes three basic components: a backup server 102, one or more clients 104, 105, 106, 107 and 108, and a backup volume 110 of data. Backup server 102 and clients 104, 105, 106, 107, and 108 are the entities which have the software necessary to run the DBRS 100 operations. Backup server 102 includes the programs and services that organize and manage the DBRS 100 functions. Clients 104, 105, 106, 107, and 108 include the programs and services that execute the DBRS 100 functions.

Backup server 102 manages data for its set of clients, such as client 104, 105, 106, 107 and 108. Clients 104, 105, 106, 107, and 108 represent machines on the network which deliver files to be backed up. Backup server 102 may incorporate the use of respective backup groups 112, 114, and 116 to organize the clients/data. Backup groups refer to sets of clients and/or data that are backed up together as a group. A single client can be included in multiple backup groups, exemplified by backup sub-group 112 and backup group 116.

To manage the data that is backed up from clients 104, 105, 106, 107, and 108, DBRS 100 relies on data tracking information, represented in FIG. 1 by a file index 118 and a media database 120 of backup server 102. The entries in file index 118 and media database 120 maintain content and location information describing all the data, both client machines and files that has been backed up in the DBRS 100 environment.

File index 118 of backup server 102 is a browseable list of backed-up files organized according to each client. Each file on each client in the network that is backed up is listed in file index 118. An entry in file index 118 includes information about the file such as the file type, the time at which the file was backed up, and other information relating to the file, such as the client machine hosting the original file. Because a file may be backed up multiple times and the backup copies may be stored in multiple locations, an entry for a file in file index 118 may contain information concerning the backup location and time of backup for each backed up version of the file. The information in file index 118 concerning multiple backup locations and backup times for a particular file enables a user to identify a specific version of the file for retrieval. Entry information concerning multiple backups of a file can remain in file index 118 for any amount of time determined by an administrator.

While file index 118 tracks information concerning individual files, media database 120 tracks the locations at which the files are stored. In other words, media database 120 contains references to media storage locations. In operation, media database 120 receives an entry each time a backup group 112, 114, or 116 is backed up to a storage volume on DBRS 100. Just as with entries in file index 118, each entry will remain in media database 120 until an administrator removes the entry. Entries in media database 120 can also be removed if the corresponding data is overwritten.

Once the location information concerning the data is known, the data can be stored in different ways. For example, the data can be stored in media volumes on devices such as tape drives, hard disks, or removable disks accessible from backup server 102, as shown in FIG. 1, or accessible by way of a remote server. In an exemplary system for backing up data, data is stored in volumes on devices, as exemplified by backup volumes 110 and a pool 124 of backup devices 126, 128, 130 and 132. An example of storing data by device and volume is storing data on a disk array, with the data storage sub-grouped into disks. Another example of storing data by device and volume is storing data on a tape drive, with the data storage sub-grouped into specific tape volumes. A final example of storing data by device and volume is storing data on a remote server with the data storage sub-grouped into hard disks on the server. Although these examples are helpful in understanding possible configurations of devices and volumes, the ability of DBRS 100 to store data in devices and volumes is not limited to the examples given. In the most general sense, backup devices 126, 128, 130 and 132 of the pool 124 refer to a conceptual model of ways for storing data that are not limited to specific systems or devices.

The usefulness of backup devices 126, 128, 130 and 132 within DBRS 100 is further enhanced by the ability of backup devices 126, 128, 130 and 132 to store data of various types. Specifically, backup devices 126, 128, 130 and 132 can contain data of every file type. For example, backup copies of image files, program execution files, and document files can be stored together in backup devices 126, 128, 130 and 132.

One underlying aspect of backup devices 126, 128, 130 and 132 is the ability of backup devices 126, 128, 130 and 132 to speed retrieval of backed-up files in DBRS 100. For example, when a user requests a restore of a backed-up file, DBRS 100 can quickly retrieve the file if the file index 118 and media database 120 entries for the file contain highly specific location information including reference to backup devices 126, 128, 130 and 132, and the particular media that was used, such as, for example, the tape, CD, DVD, or other media that was used to store the file.

With regard to many features, including backing up to backup devices 126, 128, 130 and 132, DBRS 100 is initially configured to execute functions independently. However, an administrator has many capabilities to control the DBRS 100 functionality. Thus, an administrator can segregate files for storage according to different client and/or file characteristics and can define when a backup volume has become obsolete and should be removed. For example, an administrator could configure DBRS 100 to remove a backup volume from media database 120 after a specified period of time has elapsed since the backup was created. An administrator can also define backup groups 112, 114, and 116, which could include one or more clients and their files, directories, or file systems, or all the files on a client machine.

When accessing clients 104, 105, 106, 107, and 108, the administrator can work within an administrator GUI (not shown). The administrator GUI can be displayed on any DBRS 100 machine, allowing an administrator to interface with, and broker services for, any client 104, 105, 106, 107, or 108, regardless of the client platform. Another important aspect of the capabilities of an administrator involves the ability to specify the application environment. For example, an administrator can create records that specify instructions such as backup devices DBRS 100 will use and the number of clients defined. An administrator can also specify rules that the application will enforce within the backup and recovery environment, including backup scheduling and how long data will be protected before it is recycled.

In addition to administrator capabilities, DBRS 100 also incorporates a system for recovery of lost data. When client data is lost or corrupted, users or an administrator can browse the recoverable files in file index 118 and then create a report to describe the status of the lost data or the location, tracked by media database 120, of the contents in the volumes on backup devices 126, 128, 130 and 132. The user can then recover the lost data to a user specified point in time. When a request is made to recover lost data, DBRS 100 locates the data sought and directs recovery of the file(s). Data can be recovered to client 104, 105, 106, 107, or 108 where the data originated, or to another specified client.

Furthermore, DBRS 100 has the ability to perform in heterogeneous environments and can run on a variety of different platforms. For example, backup software on a UNIX® server can support WINDOWS® clients or vice-versa. Backup data for any device or volume related to a client can be read and the data of the device or volume can be restored to a user-specified point in time by any DBRS 100 server, regardless of the server platform. Backup data from any system client 104,

105, 106, 107, or 108 can coexist in a single backup device or on a single media set, regardless of the platform of client 104, 105, 106, 107, or 108.

II. An Exemplary Database Mirroring System

The exemplary DBRS 100 outlined above intelligently stores and retrieves files on a network. In addition to the capabilities of the exemplary DBRS 100 discussed above, the exemplary DBRS 100 can support a variety of additional applications and features. One such application incorporates database backup features that account for database mirroring.

Figure 2:
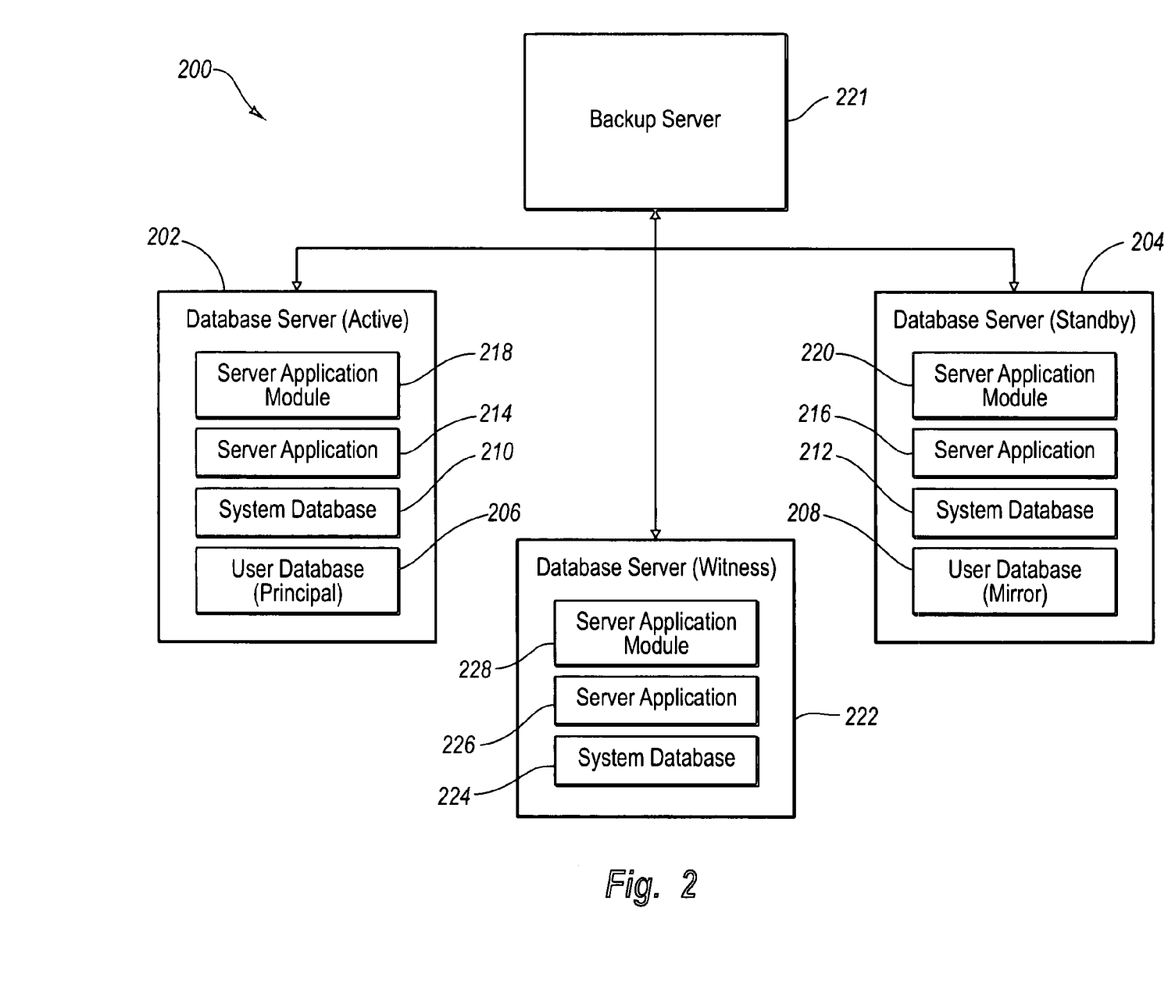
FIG. 2 illustrates an exemplary database mirroring system.

An exemplary database mirroring system 200 is shown in FIG. 2. Database mirroring system 200 includes a database server 202 and a database server 204. One of database server 202 and database server 204 is initially designated as the "active" database server, while the other is initially designated as the "standby" database server. It should be noted that these terms are used for convenience and are not intended to limit the scope of the invention in any way. When database server 202 is designated as the active database server, user database 206 located on database server 202 is the principal user database. Similarly, with database server 204 designated as the standby database server, user database 208 is the mirror user database.

In addition to user databases 206 and 208, database servers 202 and 204 include, respectively, system databases 210 and 212. System databases 210 and 212 contain information which is used to identify the roles of user databases 206 and 208 as either "principal" or "mirror." When the user databases 206 and 208 are configured to participate in database mirroring, server applications 214 and 216 update the system databases 210 and 212 installed on database servers 202 and 204, respectively, to contain information concerning the status of user databases 206 and 208 as either "principal" or "mirror." Subsequent to this initial setup, all information contained on system databases 210 and 212 concerning the status of user databases 206 and 208 as either "principal" or "mirror" is maintained by server applications 214 and 216. Each of server applications 214 and 216 monitors the status of user database 206 as well as user database 208 and records the status of each of user database 206 and user database 208 in the system database associated with the server application.

For example, when the status of user database 206 changes from "principal" to "mirror," the change in status of user database 206 is monitored by server application 214 and recorded in system database 210. The simultaneous change in status of user database 208 from "mirror" to "principal" is also monitored by server application 214 and recorded in system database 210. Likewise, when the status of user database 208 changes from "mirror" to "principal," the change in status of user database 208 is monitored by server application 216 and recorded in system database 212. The simultaneous change of status of user database 206 from "principal" to "mirror" is also monitored by server application 216 and recorded in system database 212.

Database mirroring system 200 also includes server application modules 218 and 220. A module, such as server application module 218 or 220, is a piece of code capable of performing a function, such as a backup and/or restore of user databases. For example, the function performed by a module could be a backup and/or restore of MICROSOFT SQL SERVER databases, in which case user databases 206 and 208 and system databases 210 and 212 are MICROSOFT SQL SERVER databases, and server applications 214 and 216 are Microsoft SQL Server applications. Although the exemplary database mirroring system 200 may be used in conjunction with MICROSOFT SQL SERVER databases and applications, the scope of the exemplary database mirroring system 200 is not limited to use with MICROSOFT SQL SERVER databases and applications. Server application modules 218 and 220 are each associated with a specific server application. Server application module 218 is associated with server application 214 and server application module 220 is associated with server application 216.

The functions performed by server application modules 218 and 220, within database servers 202 and 204, respectively, are an integral part of backup operations within database mirroring system 200. For example, the command to perform a backup of the principal user database in database mirroring system 200 originates at backup server 221, which corresponds to backup server 102 shown in FIG. 1. Although only the principal user database is backed up during a backup operation, a backup command will be sent by backup server 221 to both user databases 206 and 208 in database mirroring system 200. This dual command is sent because backup operations are typically performed intermittently, instead of continuously, and it is possible that the periodic change in status of a user database from "principal" to "mirror" because of failover may have occurred since the last backup operation. Therefore, since the identity of the principal user database may have changed since the last backup operation, and is therefore unknown to backup server 221, it is necessary for backup server 221 to send two backup commands so that the server application module corresponding to the user database with the current status of "principal" is sure to receive a backup command. Further details concerning the generation and use of such backup commands are provided below in connection with the discussion of FIGS. 4-6.

A backup operation can be initiated by an application at backup server 221 or by a user at backup server 221. When a backup operation is initiated, backup server 221 sends a backup command to server application module 218 located on database server 202 and to server application module 220 located on database server 204. When backup server 221 sends a backup command to server application modules 218 and 220, they in turn contact server applications 214 and 216 in order to learn the statuses of user databases 206 and 208. On database server 202, server application module 218 queries the status information in system database 210 to find out whether user database 206 is the principal user database or the mirror user database. Likewise, on database server 204, server application module 220 queries the status information in system database 212 to find out whether user database 208 is the principal user database or the mirror user database. After one of server application modules 218 or 220 identifies its corresponding user database 206 or 208 as the current principal user database, the server application module 218 or 220 corresponding to the principal user database 206 or 208 then performs the backup operation. Conversely, the server application module 218 or 220 that corresponding to the mirror user database 206 or 208 does not perform any type of backup operation.

The status of user databases 206 and 208 is determined by reading information from system databases 210 and 212. For example, when backup server 221 sends a backup command to server application module 218, server application module 218 performs the function of reading table entries in system database 210 by contacting server application 214. Likewise, when server application module 220 receives a backup command from backup server 221, server application module 220 performs the function of reading table entries in system database 212 by contacting server application 216. The table entries contained in system databases 210 and 212 contain information regarding the statuses of user databases 206 and 208. Each system database 210 and 212 contains information regarding the status of each user database 206 and 208 in database mirroring system 200. For example, system database 210 may contain information about the status of user database 206 as "principal" and also contain information about the status of user database 208 as "mirror."

As an example of the functions performed in database mirroring system 200 during a backup operation, assume that user database 206 is currently the principal user database and user database 208 is currently the mirror database. When a backup is initiated, backup server 221 sends a user database backup command both to server application module 220 located on database server 204 and to server application module 218 located on database server 202.

Server application module 220 then performs the function of reading the table entries contained in system database 212 by contacting server application 216. The table entries in system database 212 indicate that user database 208 is the mirror database. Since user database 208 is not the principal database, server application module 220 does not back up user database 208 and, instead, returns a corresponding message to backup server 221 indicating, for example, that the command to backup user database 208 failed because user database 208 is currently the mirror database.

Server application module 218, on the other hand, also performs the function of reading the table entries contained in system database 210 by contacting server application 214. The table entries in system database 210 indicate that user database 206 is the mirror database. Since user database 206 is currently the principal user database, server application module 220 is able to backup user database 206. After performing the backup operation, server application module 220 returns a message to backup server 221 indicating, for example, that the command to backup user database 206 succeeded. Server application module 220 also indicates what type of backup operation was performed, as discussed in further detail in connection with FIGS. 4-6 below.

Returning briefly to FIG. 1, when the principal user database is backed up, the name of the database server where the principal user database resides is recorded in file index 118 located on backup server 102, which corresponds to backup server 221 in FIG. 2. The entry made in file index 118 for the principal user database is a principal entry. The name of the database server where the mirror database resides is also recorded in file index 118. The entry made in file index 118 for the mirror user database is referred to as an alias entry. By recording the status of each user database at the time of a specific backup, entries in the file index 118 make it possible to reconstruct a chain of backups and provide a way to easily identify the location of the principal user database at the time of the backup in the event restoration of the principal user database is requested.

With continuing reference now to FIG. 2, while database servers 202 and 204 include, respectively, system databases 210 and 212 which track the status of user databases 206 and 208, database server 222 may also be incorporated into database mirroring system 200 to track the status of user databases 206 and 208. Database server 222 functions as a "witness" database server in database mirroring system 200. For example, when user database 206 changes status from the "principal" user database to the "mirror" user database, witness database server 222 tracks the change by recording the current status of user database 206 in system database 224. Similarly, when user database 208 changes status from the "mirror" user database to the "principal" user database, witness database server 222 also tracks the change in status of user database 208 in system database 224. In this way, system database 224 performs functions similar to those performed by system databases 210 and 212 located, respectively, on database servers 202 and 204.

An additional similarity between witness database server 222 and database servers 202 and 204 is that, like database servers 202 and 204, witness database server 222 includes a server application 226 and a server application module 228. Server application 226 performs functions equivalent to the functions performed by server applications 214 and 216. Namely, server application 226 is updated by server applications 214 and 216 regarding the status of user databases 206 and 208 and maintains a record of this information in system database 224. Server application module 228, like server application modules 218 and 220, retrieves the status information from system database 224 by contacting server application 226.

Witness database server 222 may perform other functions in addition to tracking the status changes in user databases 206 and 208. For example, witness database server 222 participates in assigning roles in database mirroring system 200. Specifically, witness database server 222 may participate in assigning the role of principal database to user database 206 and in assigning the role of mirror database to user database 208. The role assignment is based on a majority consensus between database servers 202 and 204, and witness database server 222. More particularly, witness database server 222 may arbitrate changes in the respective roles of user database 206 and user database 208. Witness database server 222 may drive automatic failover within database mirroring system 200 and the accompanying change in the statuses of user databases 206 and 208. For example, if a failover occurs when user database 206 is the principal database, witness database server 222 immediately assigns the role of principal database to user database 208 and changes the role of user database 206 to mirror database. By arbitrating the change in the roles of user databases 206 and 208, witness database server 222 ensures that no data is lost when a failover occurs. Without the presence of witness database server 222 in database mirroring system 200 automatic failover is not possible, but a user may opt to drive failover and assign user database 208 the role of principal database and user database 206 the role of mirror database.

III. An Exemplary Configuration of a Database Mirroring Environment

Figure 3:
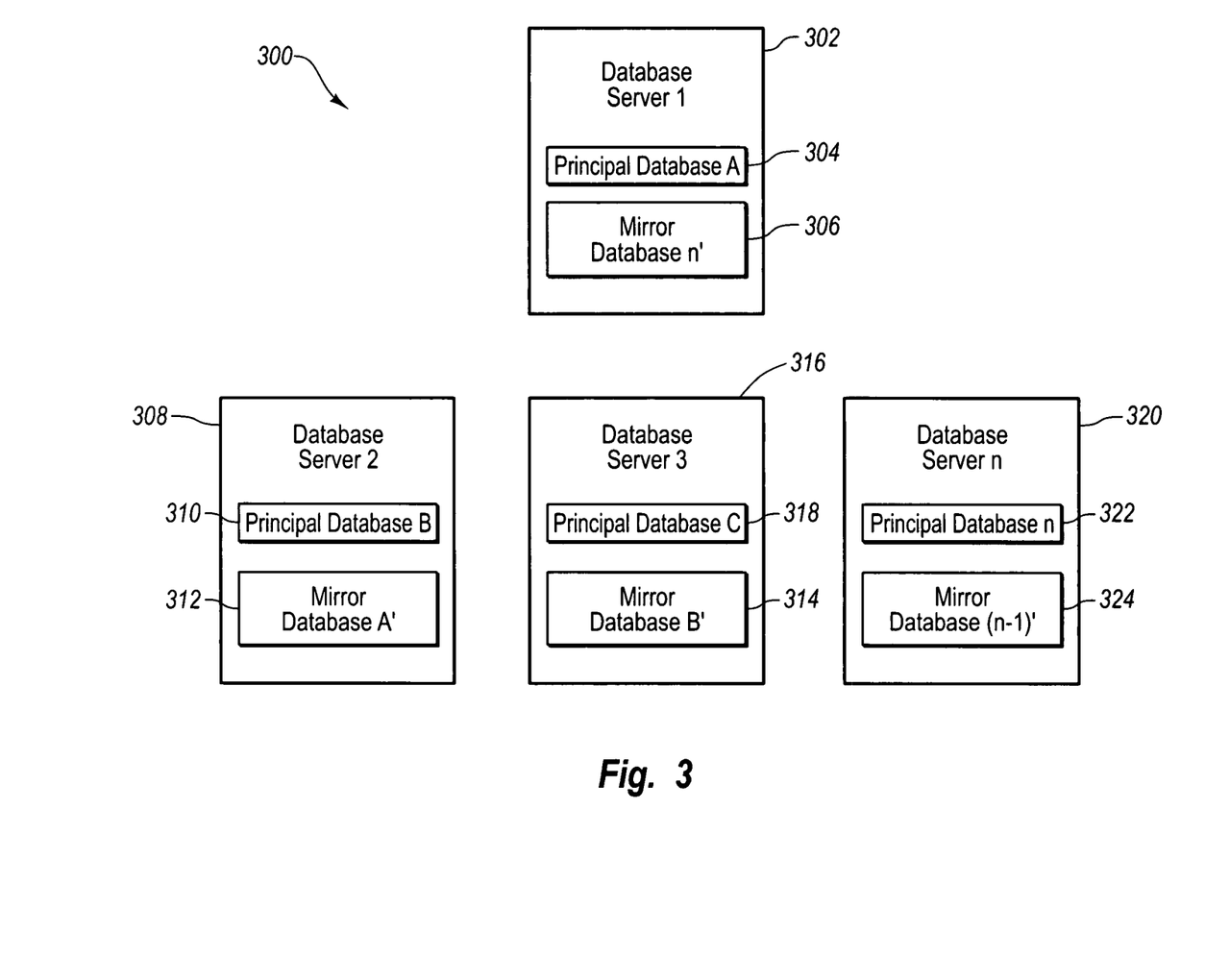
FIG. 3 illustrates an exemplary system for configuring a mirroring relationship for "n" databases in a database mirroring environment.

Although database mirroring system 200, as shown in FIG. 2, includes active database server 202, standby database server 204, and witness database server 222, numerous other configurations of mirroring databases are possible. As shown in FIG. 3, exemplary database mirroring environment 300 illustrates that there is no restriction on how many different databases may be mirrored, nor is there any restriction on the relationships between database servers hosting mirror databases. For example, a first database server 302 may host principal database "A" 304 as well as mirror database "n'" 306. A second database server 308 may host principal database "B" 310 and mirror database "A'" 312. In this example, mirror database "A'" 312 residing on second database server 308 is associated with principal database "A" 304 residing on first database server 302. The mirror database "B'" 314 associated with principal database "B" 310, however, does not reside on first database server 302 but instead resides on third database server 316. In addition to hosting mirror database "B'" 314, third database server 316 hosts principal database "C" 318. Finally, nth database server 320 hosts principal database "n" 322 and mirror database "(n−1)'" 324.

FIG. 3 illustrates an exemplary embodiment of a configuration of principal and mirror databases on multiple database servers. In addition, any database server 302, 308, 316 or 320 may serve as a witness for any database or group of databases. However, any number of different configurations of principal and mirror databases on any number of database servers is possible and contemplated by embodiments of the present invention. The scope of the invention is not limited for use in connection with any particular arrangement of principal and mirror databases residing on specific servers.

IV. Detecting Failover in a Database Mirroring Environment

When a backup of a principal database in a database mirroring environment is performed, one important function is the detection of any failover that may have occurred since the last time a backup operation was performed on the principal database. One purpose for detecting failover is to help determine what type of backup operation should be performed on the principal database in order to avoid data loss due to failover.

Among the various types of backups that can be performed on a database are full backups, incremental backups, and differential backups. A "full backup" is defined herein as a backup operation that creates a copy of all data in a database. An "incremental backup" is defined herein as a backup of only the database transaction log. A "differential backup" is defined herein as a backup operation that creates a copy of only the data in a database that has been modified since the last full backup. It should be noted that these terms are used for convenience and are not intended to limit the scope of the invention in any way.

In some situations, a full backup of the principal database is desirable, and in other situations an incremental or differential backup of the principal database is desirable. Consequently, a full backup of the principal database requires more system resources for a greater length of time than an incremental or differential backup. Therefore, if an incremental or differential backup is adequate to protect the principal database from data loss, it is desirable to avoid the extra taxing of system resources caused by a full backup and, instead, to employ an incremental or differential backup which makes more efficient use of system resources.

One exemplary situation where a full backup is desirable, however, is where failover has occurred. After failover, the pre-failover mirror database becomes the principal database, and the pre-failover principal database might become the mirror database. Therefore, if a failover event occurs between two backup operations performed on the principal database, the actual database being backed up will have switched from the pre-failover principal database to the pre-failover mirror database.

Also, because a failover event has occurred, it is possible that, at the time of the second backup, the pre-failover principal database is unavailable due to some type of hardware or software or network malfunction. Likewise, the most recent backup of the pre-failover principal database may also be unavailable. Since an incremental backup makes a copy of only those updates to the transaction log of the principal database that were made since the last incremental or full backup, if the last full incremental or full backup is unavailable, an incremental backup of the newly designated "principal" database may not be sufficient to generate a copy of the entire principal database. Therefore, in order to ensure that the backup operation avoids all data loss, if a failover event has occurred since the last time the principal database has been backed up, it is desirable to perform a full backup.

Figure 4:
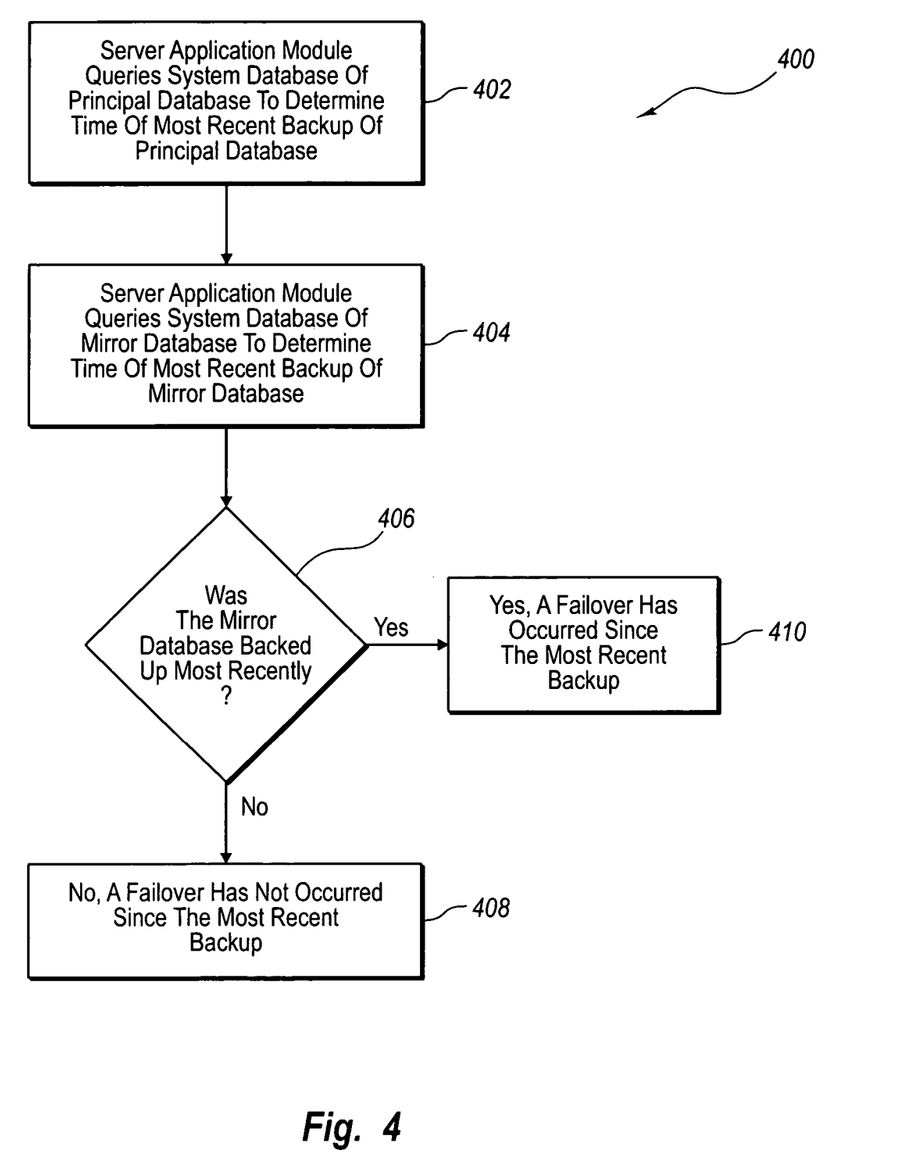
FIG. 4 is a flowchart that discloses aspects of an exemplary process for identifying the occurrence of a failover in a database mirroring environment.

Aspects of an exemplary process 400 for detecting failover are disclosed in FIG. 4. The process 400 for detecting failover begins at stage 402 where a server application module queries a system database corresponding to a principal database in order to obtain the time of the most recent backup of the principal database. At stage 404, the server application module next queries a system database corresponding to a mirror database in order to obtain the time of the most recent backup of the mirror database. Next, at stage 406, the times of the most recent backups of the principal and mirror databases are compared with each other in order to determine if the mirror database was backed up most recently.

If the server application module determines at stage 406 that the mirror database was not backed up most recently, the process 400 proceeds to stage 408 where a conclusion is reached that no failover has occurred since the time of the most recent backup. If, on the other hand, the server application module determines at stage 406 that the mirror database was backed up most recently, the process 400 will proceed to stage 410 where a conclusion is reached that a failover has occurred since the time of the most recent backup. Thus, by comparing the times of the most recent backups of the principal and mirror databases, the exemplary process 400 for detecting failover can be used to determine whether a failover has occurred since the time of the most recent backup between the principal and mirror databases.

Implementation of the exemplary process 400 for detecting failover can be further illustrated with reference to the exemplary database mirroring system 200 of FIG. 2. In this exemplary implementation, user database 206 is the principal database, and user database 208 is the mirror database, as shown in FIG. 2. After server application module 218 determines, by querying system database 210 through server application 214, that user database 206 is then assigned the role of "principal" and user database 208 is then assigned the role of "mirror," server application module 218 is prepared to initiate the process for detecting failover 400.

At stage 402, server application module 218 reads table entries in system database 210 by contacting server application 214. The table entries read from system database 210 would be those entries which contain the time of the last backup of principal user database 206. At stage 404, server application module 218 reads table entries in system database 212 by contacting server application 216. The table entries read from system database 212 would be those entries which contain the time of the last backup of mirror user database 208. At stage 406, server application module 218 compares the times of the most recent backups of principal user database 206 and mirror user database 208 in order to determine if mirror user database 206 was backed up most recently.

If server application module 218 determines at stage 406 that mirror user database 206 was not backed up most recently, server application module 218 will proceed to stage 408 and conclude that no failover has occurred since the time of the most recent backup. If, on the other hand, server application module 218 determines during stage 406 that mirror user database 208 was backed up most recently, server application module 218 will proceed to stage 410 and conclude that a failover has occurred since the time of the most recent backup.

Thus, by comparing the times of the most recent backups of principal user database 206 and mirror user database 208, the process 400 for detecting failover can be used to determine whether a failover has occurred since the time of the most recent backup between principal user database 206 and mirror user database 208. As discussed below in connection with FIGS. 5-6, information concerning the nature of the most recent backup can be used as a basis for determining what type of backup will be performed next. Additionally, details concerning how the detection of failover can be used to ensure that a principal user database backup operation avoids potential data loss are provided below in connection with the discussion of FIG. 5.

V. Backup Based on Failover Detection in a Database Mirroring Environment

Figure 5:
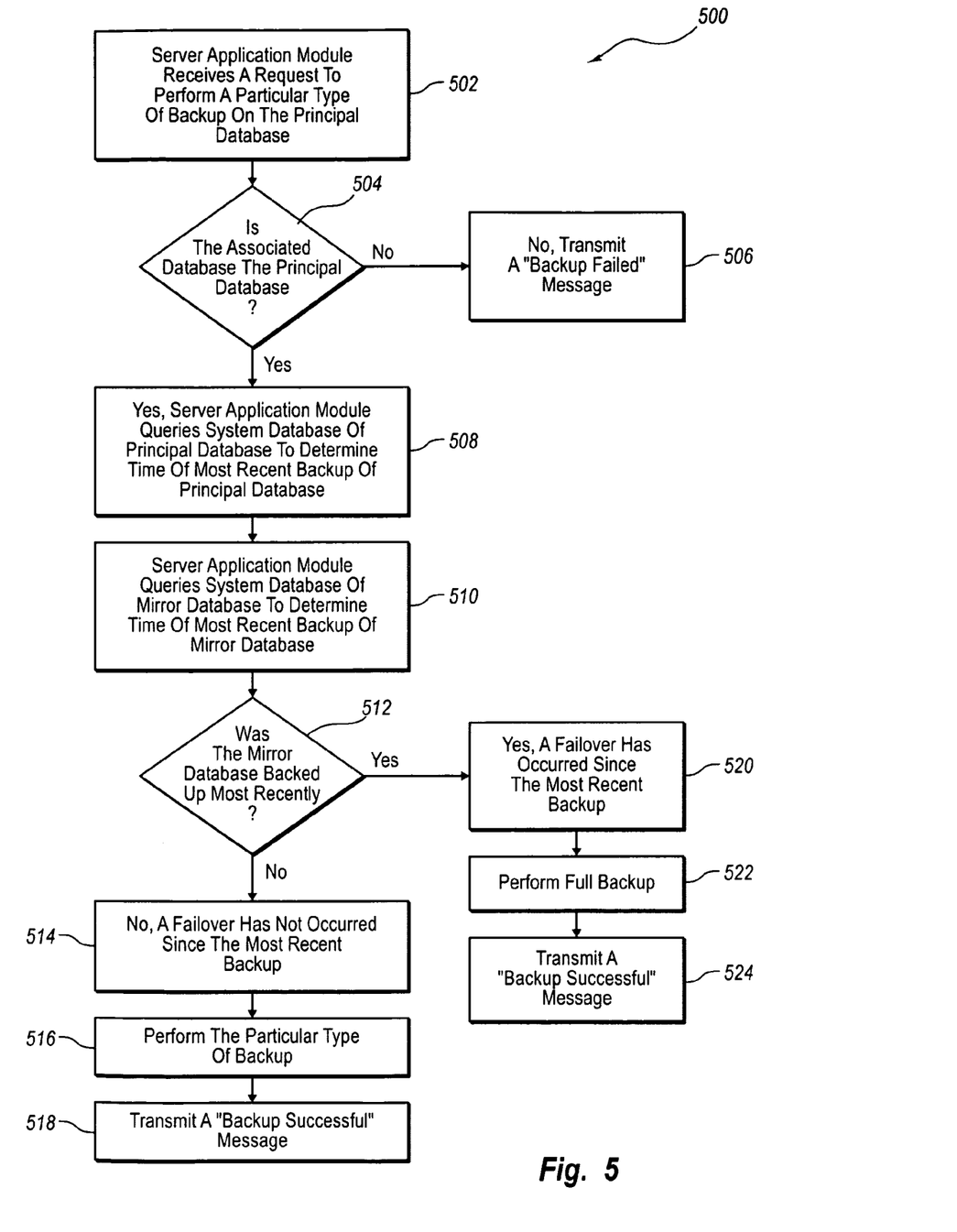
FIG. 5 is a flowchart that discloses aspects of an exemplary process, considered from a server perspective, for performing a database backup after a failover has occurred.

With reference now to FIG. 5, the process of failover detection as illustrated and described with connection to FIG. 4 can be implemented in connection with the exemplary backup process 500 of FIG. 5 in order to avoid potential data loss associated with failover. As described above, one purpose for detecting failover in a database mirroring environment is to determine what type of backup operation should be performed on the principal database so that the principal database can be adequately backed up during a backup operation.

The backup process 500 begins at stage 502 with a server application module receiving a request to perform a specific type of backup on a database, such as an incremental of differential backup. At stage 504, the server application module next determines whether the database associated with the server application module is the principal database. If the server application module determines at stage 504 that the database associated with the server application module is not the principal database, then process 500 will proceed to stage 506 and transmit a "backup failed" message. In other words, since a backup operation can only be performed on the principal database in a database mirroring system, if the database associated with the server application module is the mirror database, then no backup will be performed on the database.

If, on the other hand, the server application module determines during stage 504 that the database associated with the server application module is the principal database, then the server application module will proceed to stage 508. At stage 508, the server application module next queries a system database corresponding to a principal database in order to obtain the time of the most recent backup of the principal database. At stage 510, the server application module next queries a system database corresponding to a mirror database in order to obtain the time of the most recent backup of the mirror database. Then, at stage 512, the times of the most recent backups of the principal and mirror databases are compared in order to determine if the mirror database is the database that was backed up most recently.

If the server application module determines at stage 512 that the mirror database was not backed up most recently, the process 500 will proceed to stage 514 and conclude that no failover has occurred and will perform the particular type of backup requested at stage 516. Then, at stage 518, the server application module will transmit a "backup successful" message. Also at stage 518, the application server module will also transmit a message indicating particular type of backup requested was actually performed and indicating that no failover has occurred.

If, on the other hand, the server application module determines during stage 512 that the mirror database was backed up most recently, the server application module will proceed to stage 520 and conclude that a failover has occurred. The server application will then proceed to stage 522 and will promote the requested backup to a full backup and perform the full backup on the principal database. Finally, at stage 524, the server application module will transmit a "backup successful" message. Also at stage 524, the application server module will also transmit a message indicating that a full backup was performed and indicating that a failover has occurred. Thus, by comparing the times of the most recent backups of the principal and mirror databases, backup process 500 can be used to determine whether a failover has occurred since the time of the most recent backup between the principal and mirror databases, and if so, promote the requested backup to a full backup.

One exemplary implementation of backup process 500 can be illustrated with reference to the exemplary database mirroring system 200 of FIG. 2. In this exemplary implementation, user database 206 is the principal user database, and user database 208 is the mirror user database, as shown in FIG. 2.

At stage 502 of backup process 500, both server application module 218 and server application module 220 receive an incremental backup request sent by backup server 221. Because of the possibility of a failover since the last backup request was sent by backup server 221, and because backup server 221 is not notified when a failover occurs, backup server 221 can not be certain that the principal user database that was backed up during the most recent backup process continues to maintain the role of "principal." Therefore, a backup request must be sent to both server application modules 218 and 220 in database mirroring system 200 in order to ensure that the server application module corresponding to the user database with the current role of "principal" receives the backup request.

This dual backup request does not result in dual backup operations being performed, however, because when server application module 220 receives the backup request, at stage 504 it will determine that its associated user database 208 has the current role of "mirror" and will proceed to stage 506 where it will notify backup server 221 that the "backup failed," without performing a backup of mirror user database 208. In other words, the principal database is not accessible to server application module 220. The term "accessible" as used herein is defined as associated with a particular server application module, such that when a request is received by a server application module to perform a backup operation on the principal database, the principal database can be accessed by the server application module in order to perform a backup operation on the principal database. Conversely, server application module 218 will determine at stage 504, by querying system database 210 through server application 214, that user database 206 is currently assigned the role of "principal" and user database 208 is currently assigned the role of "mirror." In other words, the principal database is accessible to server application module 218. Server application module 218 will then continue to stage 508 of backup process 500.

At stage 508, server application module 218 performs the function of reading table entries in system database 210 by contacting server application 214. The system database 210 table entries read by server application module 218 would be those entries which contain the time of the last backup of principal user database 206. At stage 510, server application module 218 performs the function of reading table entries in system database 212 by contacting server application 216. The system database 212 table entries read from system database 212 would be those entries which contain the time of the last backup of mirror user database 208. At stage 512, server application module 218 compares the times of the most recent backups of principal user database 206 and mirror user database 208 in order to determine if mirror user database 208 was backed up most recently.

If server application module 218 determines during stage 512 that the mirror user database 208 was not backed up most recently, server application module 218 will proceed to stage 514 and conclude that no failover has occurred since the time of the most recent backup. Since no failover has occurred, server application module 218 will proceed to stage 516 and perform the requested incremental backup on principal user database 206. Then, at stage 518, server application module 218 will transmit a "backup successful" message to backup server 221. Also at stage 518, application server module 218 will also transmit a message to backup server 221 indicating that an incremental backup was actually performed and also indicating that no failover has occurred.

If, on the other hand, server application module 218 determines during stage 512 that mirror user database 208 was backed up most recently, server application module 218 will proceed to stage 520 and conclude that a failover has occurred since the time of the most recent backup. Since a failover has occurred, server application module 218 will not perform the requested incremental backup on principal user database 206. Instead, server application module 218 will proceed to stage 522 and perform a full backup on principal user database 206. Then, at stage 522, server application module 218 will transmit a "backup successful" message to backup server 221. Also at stage 522, application server module 218 will also transmit a message to backup server 221 indicating that a full backup was actually performed and also indicating that a failover has occurred.

Thus, by comparing the times of the most recent backups of principal user database 206 and mirror user database 208, backup process 500 can determine whether a failover has occurred since the time of the most recent backup between principal user database 206 and mirror user database 208. By determining whether a failover has occurred, backup process 500 can automatically promote an incremental backup request to a full backup where a failover has occurred to ensure that no data is lost due to the failover.

Figure 6:
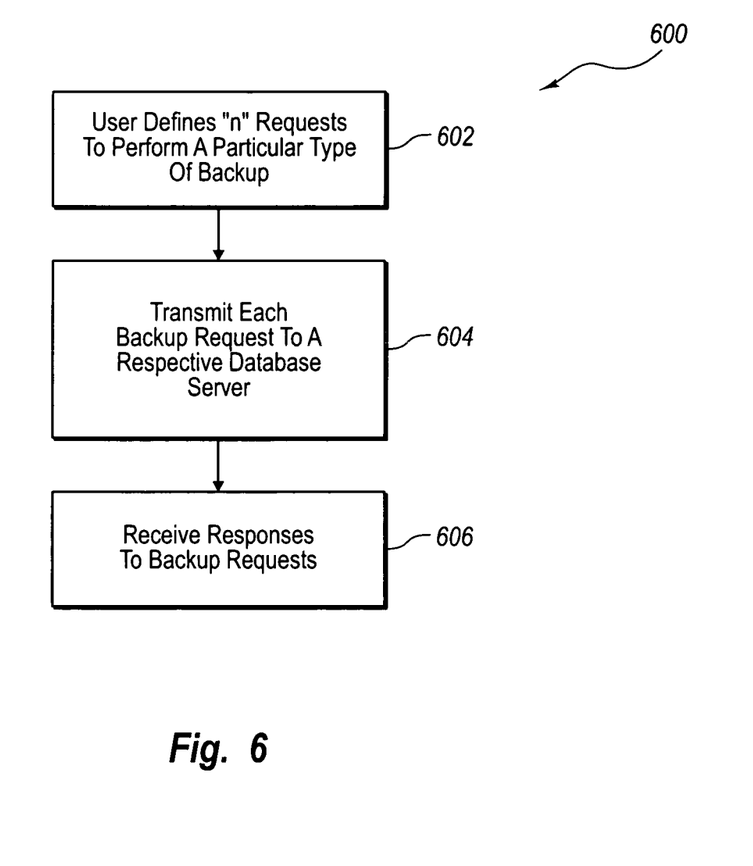
FIG. 6 is a flow chart that discloses exemplary aspects of a process, considered from a user perspective, for causing the performance of a database backup in a database mirroring system.

Directing attention finally to FIG. 6, details are provided concerning an exemplary process 600 for causing the performance of a database backup in a database mirroring system. At stage 602, a user defines "n" requests to perform a particular type of backup. Each request comprises a request to a targeted database server to perform a backup of the principle database of the database mirroring system. In exemplary process 600, each targeted database server is associated with one database in the database mirroring system. As noted earlier however, each database mirroring system has only one principal database, and the database server associated with the principal database is known as the "active" database server. As also noted earlier, only the principal database can be backed up. Therefore, only the active database server can successfully backup its associated database.

At stage 604, the "n" backup requests are then transmitted, respectively, to "n" database servers. Although the database mirroring systems described above in connection with FIGS. 2 and 3 included only two databases, one principal database and one mirror database, a database mirroring system could include more than two databases. For example, a database mirroring system could include a principle database and two or more mirror databases. Therefore, in exemplary process 600, "n" represents two or more database servers.

Moving to stage 606, the user then receives a response from each database server to which a backup request was directed. In this exemplary implementation, all but one of the responses will indicate "backup failed," meaning that the database server is unable to perform the requested backup because that database server is not then the "active" database server. However, one of the database servers, particularly, the "active" database server, will return a response that indicates "backup successful," meaning that because that server is the active database server, the requested backup was performed by that database server. The server able to perform the requested backup will also indicate whether or not a failover has occurred. One example of a process for making such a determination was discussed above in connection with FIG. 4. Finally, the database server able to perform the requested backup operation will also indicate what type of backup was performed on the principal database. If a failover has occurred, the database server will indicate that a full backup has been performed. If a failover has not occurred, the database server will indicate that the particular type of backup requested was performed. One example of a process for using the failover information to determine backup type is illustrated in FIG. 5, discussed above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a database mirroring system that includes a first database and a second database, wherein one of the first database and the second database is designated as an active database and the other of the first database and the second database is designated as a standby database that mirrors the active database, a method for backing up the database mirroring system, the method comprising:
 receiving a backup request to perform a particular type of backup on the active database at a backup server;
 sending, by the backup server, a dual backup command to both the first database and to the second database, the dual backup command comprising the same instructions for both the first database and the second database to perform the particular type of backup, such that whichever of the first and the second database is currently active is scheduled to perform the particular type of backup according to the instructions, wherein a backup failed message is received at the backup server from the standby database in response to the backup command and no backup is performed on the standby database;
 determining a first time of a most recent backup of the active database;
 determining a second time of the most recent backup of the standby database;
 comparing the first time of the most recent backup of the active database to the second time of the most recent backup of the standby database to determine whether the standby database was backed up most recently;
 establishing that a failover has occurred when the standby database is the database that was backed up most recently, wherein roles of the first and second database changed during the failover;
 performing a full backup of the active database to a backup server after determining that the failover has occurred, wherein the particular type of backup is performed when the failover has not occurred; and
 recording a status of the first database and of the second database in a file index such that a location of the active database at a time of the backup can be identified in an event that restoration of the active database is requested, wherein the status is tracked by a witness database; and
 wherein when the failover occurs, the standby database is designated as the active database and the active database is designated as the standby database based on a consensus between the first database, the second database and the witness database.

2. The method as recited in claim 1, wherein determining the time of the most recent backup of the active database comprises querying a system database where the time of the most recent backup of the active database is stored.

3. The method as recited in claim 1, wherein determining the time of the most recent backup of the standby database comprises querying a system database where the time of the most recent backup of the standby database is stored.

4. The method as recited in claim 1, wherein when the active database is the most recently updated database, the occurrence of the failover is not established.

5. The method as recited in claim 1, wherein establishing that a failover has occurred is performed in response to receipt of the backup request.

6. The method as recited in claim 5, wherein the occurrence, or not, of the failover serves as a basis for the particular type of backup to be performed.

7. The method as recited in claim 6, wherein the particular type of backup to be performed when a failover is not established is a full, incremental, or differential backup.

8. In a database mirroring system that includes a first database and a second database and one of the first database and the second database is designated as a principal database and the other of the first and second database is designated as a mirror database that mirrors the principal database, a method for backing up the principal database, the method comprising:
receiving a request to perform a particular type of backup of the principal database;
sending a dual backup command to both the first database and to the second database, the dual backup command comprising the same instructions for both the first database and the second database to perform the particular type of backup, such that whichever of the first and the second database is currently active is scheduled to perform the particular type of backup according to the instructions, wherein the first database returns a backup failed message when the first database is the mirror database, wherein the particular type of backup is not performed on the first database when the first database is the mirror database and further returns a message indicating that backup failed on the first database when the status of the first database is the mirror database in response to the request to perform a particular type of backup of the principal database;
determining whether a failover occurred in the database mirroring system since the time of the most recent backup of the database mirroring system when the status of the first database is the principal database, wherein the failover occurs when a most recent backup of the principal database is less recent than a most recent backup of the mirror database, wherein roles of the first database and the second database change during failover such that the mirror database becomes the principal database;
performing a full backup of the principal database to a backup server when the status of the first database is principal database and the failover is detected in the database mirroring system;
performing the requested particular type of backup of the principal database to the backup server when the status is principal database and the failover is not detected in the database mirroring system; and
recording a status of the first database and of the second database in a file index such that a location of the active database at a time of the backup can be identified in an event that restoration of the active database is requested, wherein the status is tracked by a witness database;
wherein when the failover occurs, the mirror database is designated as the principal database and the principal database is designated as the mirror database based on a consensus between the first database, the second database and the witness database.

9. The method as recited in claim 8, wherein determining whether a failover occurred in the database mirroring system since the time of the most recent backup of the database mirroring system further comprises:
determining the time of the most recent backup of the principal database;
determining the time of the most recent backup of the mirror database;
comparing the time of the most recent backup of the principal database to the time of the most recent backup of the mirror database in order to determine whether the mirror database was backed up most recently; and
establishing that failover has occurred when the mirror database is the database that was backed up most recently.

10. The method as recited in claim 8, wherein receiving a request to perform a particular type of backup of the principal database is performed according to a schedule specifying a time for automatically backing up the principal database.

11. The method as recited in claim 8, wherein receiving a request to perform a particular type of backup of the principal database is performed in response to user initiation of a backup of the principal database.

12. The method as recited in claim 9, wherein determining the time of the most recent backup of the principal database comprises querying a system database where the time of the most recent backup of the principal database is stored.

13. The method as recited in claim 9, wherein determining the time of the most recent backup of the mirror database comprises querying a system database where the time of the most recent backup of the mirror database is stored.

14. The method as recited in claim 8, wherein the particular type of backup to be performed is a full, incremental, or differential backup.

15. In a database mirroring system having at least two database servers, each of which is associated with one or more databases, wherein a status of one of the two database servers is a principal database and a status of the other of the two database servers is a mirror database that mirrors the principal database, a method for causing a backup of the database server having the status of the principal database, the method comprising:
identifying at least one request to perform a particular type of backup;
transmitting the at least one request to the at least two database servers, the at least one request comprising the same instructions for both the one database server and the other database server to perform the particular type of backup, such that whichever of the one database server and the other database server is currently active is scheduled to perform the particular type of backup according to the instructions, wherein roles of the at least two database servers change during failover wherein the status of the principal database becomes the mirror database and the status of one of the mirror databases included in the at least two database servers becomes the principal database;
receiving a response from one of the database servers to which the request was transmitted indicating that a backup of the principal database was performed to a backup server, where the type of backup performed was based at least in part upon a determination as to whether or not a failover has occurred in the database mirroring system, wherein the backup server compares when the at least two database servers which were most recently backed up to determine whether the failover has occurred and to determine whether to perform the particular type of backup, wherein the type of backup performed is the particular type of backup when the failover is not detected and wherein a full backup of the principal database is performed if the failover is detected, wherein the failover is detected when a time of the most recent backup of the principal database is less recent that a time of the most recent backup of one of the other at least two database servers;

receiving additional responses from the remaining database servers whose status is the mirror database to which the request was transmitted indicating that backup was not performed; and recording a status of the at least two database servers in a file index such that a location of the database server that is the principal database at a time of the backup can be identified in an event that restoration of the principal database is requested, wherein the status is tracked by a witness database;

wherein when the failover occurs, the database mirror operating as the mirror database is designated as the principal database and the database server operating as the principal database is designated as the mirror database based on a consensus between the first database, the second database and the witness database.

16. The method as recited in claim 15, further comprising receiving input, from the database server that responded with the indication that the backup had been performed, concerning whether or not the failover has occurred in the database mirroring system.

17. The method as recited in claim 15, wherein the particular type of backup requested to be performed when a failover has not occurred in the database mirroring system, is a full, incremental, or differential backup.

* * * * *